(12) United States Patent
Suwa (10) Patent No.: US 11,032,438 B2
(45) Date of Patent: Jun. 8, 2021

(54) READING CONTROL APPARATUS AND CONTROL METHOD

(71) Applicant: CANON KABUSHIKI KAISHA, Tokyo (JP)

(72) Inventor: Taisuke Suwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/521,392

(22) Filed: Jul. 24, 2019

(65) Prior Publication Data

US 2020/0045190 A1 Feb. 6, 2020

(30) Foreign Application Priority Data

Aug. 1, 2018 (JP) .............................. JP2018-145043

(51) Int. Cl.
*H04N 1/00* (2006.01)
(52) U.S. Cl.
CPC ..... *H04N 1/00477* (2013.01); *H04N 1/00488* (2013.01)

(58) Field of Classification Search
None
See application file for complete search history.

(56) References Cited

U.S. PATENT DOCUMENTS

| | | | | |
|---|---|---|---|---|
| 2008/0158144 A1* | 7/2008 | Schobben | ............. | G06F 1/3265 345/156 |
| 2011/0242625 A1* | 10/2011 | Yokochi | ............... | H04N 1/0057 358/498 |
| 2015/0312437 A1* | 10/2015 | Hamaguchi | .............. | H04N 1/04 358/474 |

FOREIGN PATENT DOCUMENTS

JP 2015-213253 A 11/2015

* cited by examiner

*Primary Examiner* — Frantz Bataille
(74) *Attorney, Agent, or Firm* — Canon U.S.A., Inc. I.P. Division (57) ABSTRACT

A reading control apparatus includes a notification unit which executes predetermined notification based on completion of a first reading processing of a portion of a document to be scanned using a large size document scanning process.

18 Claims, 9 Drawing Sheets

READING CONTROL APPARATUS AND CONTROL METHOD

BACKGROUND

Field

The present disclosure relates to a reading control apparatus and a control method.

Description of the Related Art

A reading control apparatus is known which can perform large size document scanning by reading one large size document a plurality of times by changing placement of the document on a document platen.

Japanese Patent Application Laid-Open No. 2015-213253 describes a technique in which a document larger than a size which can be read in a single reading operation is read a plurality of times, and a plurality of pieces of scan data is generated.

In order to perform a second reading in a large size document scan in which a document is read a plurality of times, it is necessary to perform additional user operations such as an operation for resetting the document on a document platen and an operation for issuing an instruction for the second reading after completion of the first reading. Therefore, it is desirable that a reading control apparatus issues notification to a user based on completion of the first reading in such a large size document scan. The notification to a user is generally performed by displaying a notification screen on a display unit included in the reading control apparatus. However, an issue can arise where due to a large size document being read in the large size document scan, the large size document placed on a document platen may cover the display unit depending on a position and a size of the display unit, and thus may hinder communication of the notification to a user in some cases. Further, an issue can arise where it is difficult for a user to recognize the notification provided to the user, the notification provided based on completion of reading of the document in the large size document scan.

SUMMARY

According to various embodiments of the present disclosure, a reading control apparatus which includes a document platen, a reading unit reads a document placed on the document platen and a display unit, the display unit being at least partially covered in a case where a document having at least a predetermined size is placed on the document platen, the document at least partially covering the display unit, the reading control apparatus comprising at least one processor, the at least one processor executes, displaying, on the display unit, a screen for receiving an execution instruction for first reading processing for reading a first area of the document, executing the first reading processing based on reception of the execution instruction for the first reading processing, executing predetermined notification using a sound generated by a loudspeaker, based on completion of the first reading processing, receiving an execution instruction for second reading processing for reading a second area of the document, the second area including an area of the document different from the first area, executing the second reading processing based on reception of the execution instruction for the second reading processing, and executing output processing for outputting an image including an image based on image data obtained by the first reading processing and an image based on image data obtained by the second reading processing, based on completion of the second reading processing.

According to other embodiments of the present disclosure, a reading control apparatus which includes a document platen, a reading unit reads a document placed on the document platen and a display unit, the display unit being at least partially covered in a case where the document having at least the predetermined size is placed on the document platen, the document at least partially covering the display unit, the reading control apparatus comprising at least one processor, the at least one processor executes, displaying, on the display unit, a screen for receiving an execution instruction for first reading processing for reading a first area of the document, executing the first reading processing based on reception of the execution instruction for the first reading processing, executing predetermined notification using light emitted from a light-emitting unit based on completion of the first reading processing, receiving an execution instruction for second reading processing for reading a second area of the document, the second area including an area of the document different from the first area, executing the second reading processing based on reception of the execution instruction for the second reading processing, and executing output processing for outputting an image including an image based on image data obtained by the first reading processing and an image based on image data obtained by the second reading processing based on completion of the second reading processing, wherein the light-emitting unit is located on a position at which the light-emitting unit is not covered with a document having the predetermined size in a case where the document having the predetermined size is placed on the document platen.

Further features will become apparent from the following description of exemplary embodiments with reference to the attached drawings.

DESCRIPTION OF THE EMBODIMENTS

Various exemplary embodiments will be described in detail below with reference to the attached drawings. The exemplary embodiments described below do not restrict the scope of the invention according to the claims, and all of combinations of the features described in the exemplary embodiments are not always essential to the solution according to various embodiments of the present disclosure.

A reading control apparatus according to a first exemplary embodiment will be described. According to the present exemplary embodiment, a multifunction peripheral which has an image reading function (a scan function) of obtaining image data by causing a reading unit to read a reading target and an ink jet recording method print function is described as an example of a reading control apparatus. However, the reading control apparatus may not be a multifunction peripheral (MFP) but a single function apparatus having only an image reading function. The reading control apparatus may function as an image reading apparatus.

<Configuration of Reading Control Apparatus>

Figure 1:
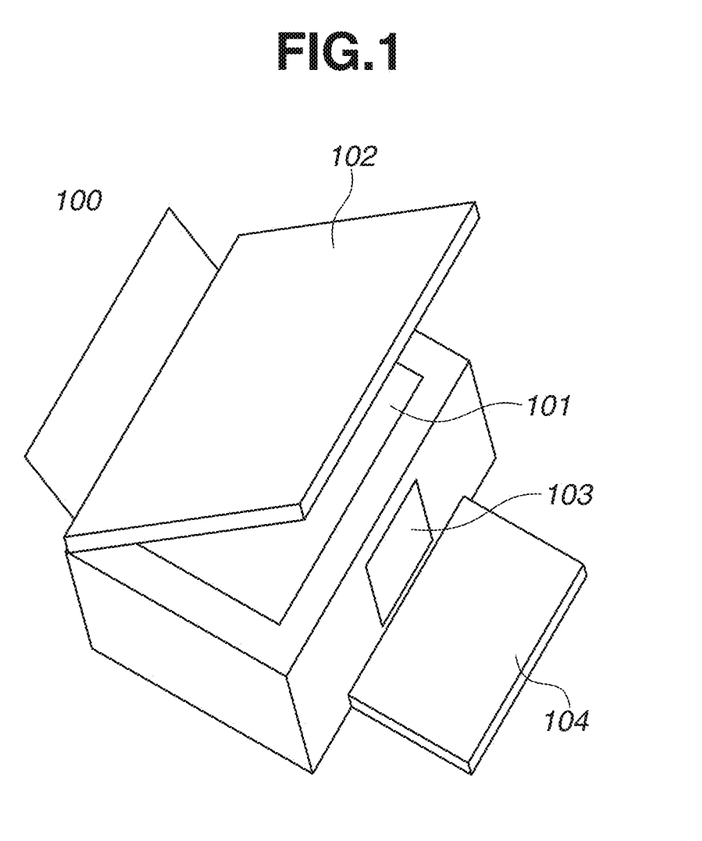
FIG. 1 is an external view of a reading control apparatus.

FIG. 1 is an external view of an MFP 100 as a reading control apparatus to which the present exemplary embodiment is applied. The MFP 100 includes a document platen 101 including a contact glass on which a document is placed, a scanner cover (a pressing plate) 102 for pressing a document placed on the document platen 101 from above, an operation display unit 103, a sheet discharge port 104 to which a printed sheet is discharged, and a sheet feed port 105 for feeding a sheet.

In a case where scan is performed, a user places a document on the document platen 101 and then closes the scanner cover 102. Further, the user operates the operation display unit 103 and causes the MFP 100 to read the document on the document platen 101. In a case where copy is performed, the MFP 100 prints an image based on image data obtained by reading the document on a sheet set in the sheet feed port 105 in addition to the above-described scan processing. Subsequently, the MFP 100 discharges the printed sheet from the sheet discharge port 104.

According to the present exemplary embodiment, a maximum size of a document that the MFP 100 can read in a single operation is an A4 size but may be different from the A4 size. A maximum size of a sheet which can be set in the sheet feed port 105 is an A3 size, but may be different from the A3 size.

The operation display unit 103 displays a soft button and a soft key for receiving an operation (an input) from a user, a screen for notifying a user of information, and the like. According to the present exemplary embodiment, the operation display unit 103 is installed on a front surface of the MFP 100 (a side surface on which the sheet discharge port 104 is arranged). Therefore, according to the present exemplary embodiment, if, for example, an A3 size document is placed on the document platen 101, the operation display unit 103 is located at such a position that at least a part of the operation display unit 103 is covered with a portion of the document spreading beyond the document platen 101.

Figure 3:
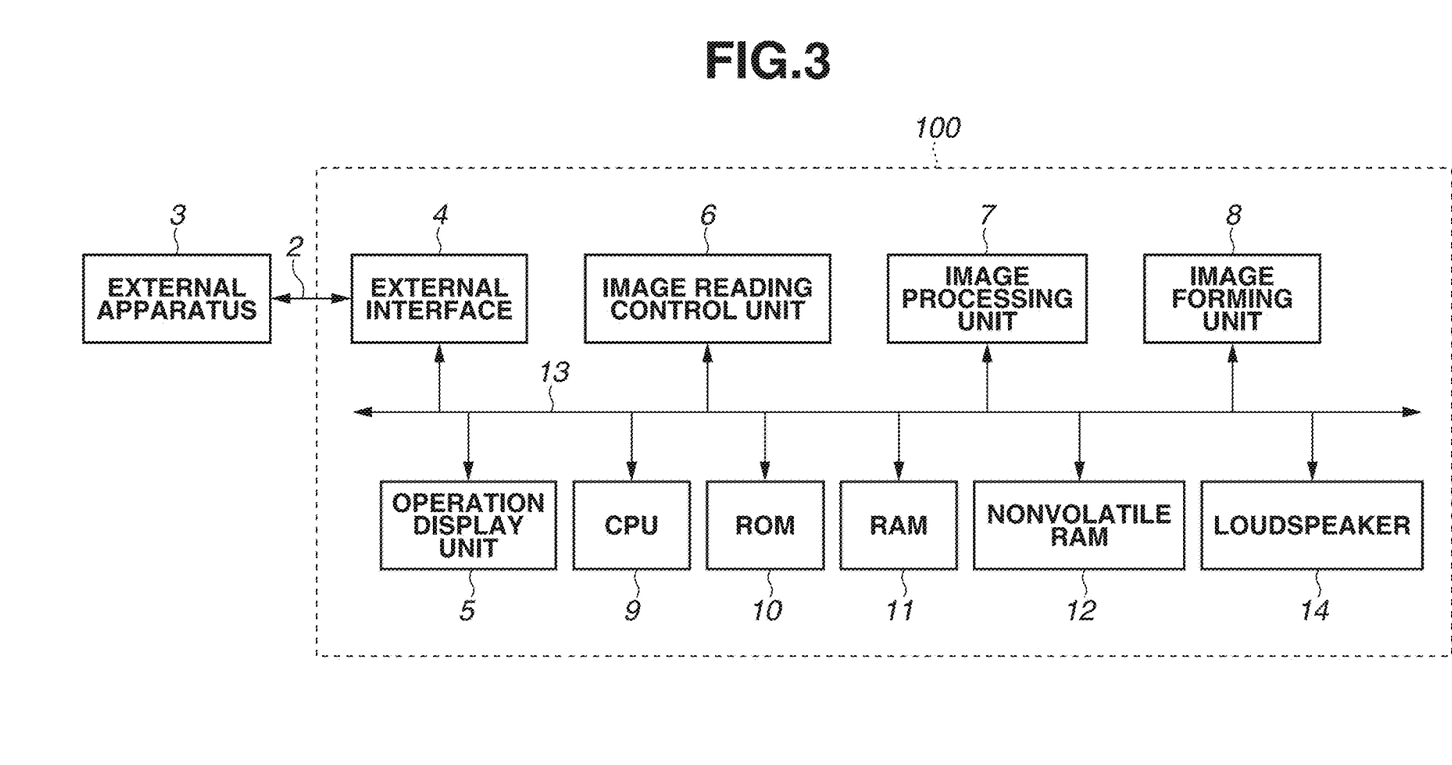
FIG. 3 is a hardware configuration diagram of the reading control apparatus.

FIG. 3 is a block diagram illustrating a hardware configuration of the MFP 100 as the reading control apparatus according to the present exemplary embodiment. As described above, the MFP 100 has the scan function of storing image data generated by reading a document in a predetermined storage area. Further, the MFP 100 has a copy function of printing an image based on image data generated by reading a document, a mail function of transmitting image data generated by reading a document to an external apparatus from the MFP 100, and the like.

The MFP 100 is connected to an external apparatus 3 via an external interface 4 and an external bus 2. According to the present exemplary embodiment, the external bus 2 is a Universal Serial Bus (USB), and the external interface 4 is a USB interface, but the external bus 2 and the external interface 4 are not limited to the configuration. For example, the external bus 2 may be a bus based on another wired communication method. Further, the MFP 100 may be wirelessly connected to the external apparatus 3 by adopting a wireless communication unit as the external interface 4. In this case, the MFP 100 may directly communicate with the external apparatus 3 by wireless communication and may communicate with the external apparatus 3 via an external access point existing outside of the MFP 100 and the external apparatus 3. A wireless communication method used for wireless connection between the MFP 100 and the external apparatus 3 includes, for example, Wireless Fidelity (Wi-Fi)® and Bluetooth®. An external access point includes, for example, a device such as a wireless local area network (LAN) router.

A central processing unit (CPU) 9 is a processor that controls the MFP 100 by a program. Specifically, the CPU 9 performs various types of control such as reading control and print control by loading a control program stored in a read-only memory (ROM) 10 to a random access memory (RAM) 11 and reading the control program as necessary.

An internal bus 13 connects each hardware configuration included in the MFP 100 with each other.

The ROM 10 stores various programs such as a control program executed by the CPU 9 and a built-in operating system (OS) program. According to the present exemplary embodiment, the control program stored in the ROM 10 performs software control such as scheduling and a task switch under management of the built-in OS stored in the ROM 10. According to the present exemplary embodiment, the ROM 10 also stores image data, various programs, and various setting information. According to the present exemplary embodiment, a flash storage and the like are assumed as the ROM 10, but an auxiliary storage device such as a hard disk may be used as the ROM 10.

The RAM 11 which is a memory such as a static RAM (SRAM) stores a program control variable, management data of a power receiving device 200 such as a setting value registered by a user, and the like, and is provided with a buffer area for various work. The above-described data may be stored not in the RAM 11 but in other storage areas such as the ROM 10 and a nonvolatile RAM 12. The RAM 11 is also used as a temporary storage area in which various programs stored in the work area and the ROM 10 are loaded. The nonvolatile RAM 12 is a memory which can retain data without volatilizing the data even when a power source is turned off. Specifically, the nonvolatile RAM 12 stores user data such as network information, a list of an external apparatus connected in the past, a menu item such as a print mode, and setting information of the MFP 100 such as correction information of a recording head. According to the present exemplary embodiment, a computer is formed by the CPU 9, the ROM 10, the RAM 11, and others.

An operation display unit 5 is provided with a liquid crystal display unit having a touch panel function and an operation key and corresponds to the operation display unit 103. In other words, the operation display unit 5 functions as an operation unit which receives various operations from a user and a display unit which displays information for a user. According to the present exemplary embodiment, the operation display unit 5 is configured with a touch panel, and thus the operation unit and the display unit are formed as the same unit. However, the operation unit and the display unit may be configured as separate units by configuring, for example, the operation unit with a physical key and the like. The MFP 100 can receive a print operation command, a copy operation command, and a scan operation command from a user by receiving an operation by the user performed on the operation display unit 5. In a case where a print operation command is received from a user via the operation display unit 5, the MFP 100 performs printing based on image data stored in a storage medium such as a secure digital (SD) card.

An image reading control unit 6 is a circuit for performing analog-to-digital (A/D) conversion on an analog electrical signal obtained by reading a document by an image sensor unit (a reading unit) and also performing characteristic correction of the image sensor unit. The image sensor unit includes a light source which irradiates a document with light and an image sensor in which elements for reading reflected light and performing photoelectric conversion thereon are arranged. The image reading control unit 6 further includes a circuit for performing direct memory access (DMA) transfer in order to store image data obtained by performing A/D conversion on the analog electrical signal in the RAM 11.

An image processing unit 7 is a circuit for reading image data stored in a memory such as the RAM 11 and performing various image processing such as smoothing processing, recording density correction processing, and color correction thereon. Further, the image processing unit 7 includes a circuit for reading image data stored in the memory such as the RAM 11 and performing encoding processing on the read image data using a Joint Photographic Experts Group (JPEG) method and a circuit for performing decoding processing on the encoded data. As an encoding method, for example, the JPEG method can be applied, but another encoding method may be adopted.

A loudspeaker 14 generates a sound. The sound generated by the loudspeaker 14 may be, for example, a buzzer sound and a voice.

According to the present exemplary embodiment, the reading control apparatus includes the reading unit, the image reading control unit 6, and the image processing unit 7. However, the reading control apparatus is not limited to the above-described embodiment and does not have to include all of these components. For example, the reading control apparatus may be an apparatus which transmits a scan instruction to an external scanner apparatus having the above-described configuration and thus obtains image data from the scanner apparatus.

The external apparatus 3 is an apparatus outside of the MFP 100, such as a mobile phone, a smartphone, a personal computer (PC), a tablet terminal, a personal digital assistant (PDA), and a digital camera. The hardware configuration diagram is as described above.

Scan processing according to the present exemplary embodiment is described. In a case where the MFP 100 is used as a scanner, the CPU 9 causes the image reading control unit 6 including the image sensor unit to scan in a predetermined direction while irradiating a document placed on a document reading surface described below with light by a light emitting diode (LED). Specifically, the CPU 9 changes light emitted from the LED from red (R), green (G), to blue (B) and controls incident light to the image sensor. Subsequently, the CPU 9 reads reflected light from the document by the image sensor of the image reading control unit 6 and obtains an analog electrical signal. Further, the CPU 9 performs A/D conversion and characteristic correction on the analog electrical signal obtained by the image reading control unit 6 and obtains a digital signal. According to the present exemplary embodiment, obtaining an output corresponding to a certain area by the image sensor corresponds to reading a document in the area by the image sensor and generating image data corresponding to the area.

The CPU 9 stores the digital signal in the RAM 11 as image data. The CPU 9 applies JPEG encoding to the image data stored in the RAM 11 by the image processing unit 7 and obtains encoded data. The CPU 9 stores the encoded data in the RAM 11. Further, the CPU 9 transmits the encoded data from the external interface 4 to the external apparatus 3 via the external bus 2. The external apparatus 3 applies decoding to the received encoded data and thus can obtain the image data obtained by the scan.

In a case where MFP 100 is used as a copying machine and executes copy processing, the CPU 9 performs processing similar to the above-described scan processing up to a point that the encoded data is stored in the RAM 11. The CPU 9 then applies decoding to the encoded data by the image processing unit 7 and obtains the image data again. Further, the CPU 9 performs various image processing on the obtained image data and obtains print data. The CPU 9 causes an image forming unit 8 to form an image based on the obtained print data on a recording medium (paper etc.) using a recording material (ink, toner, etc.). Accordingly, the copy processing is executed.

Figure 2:
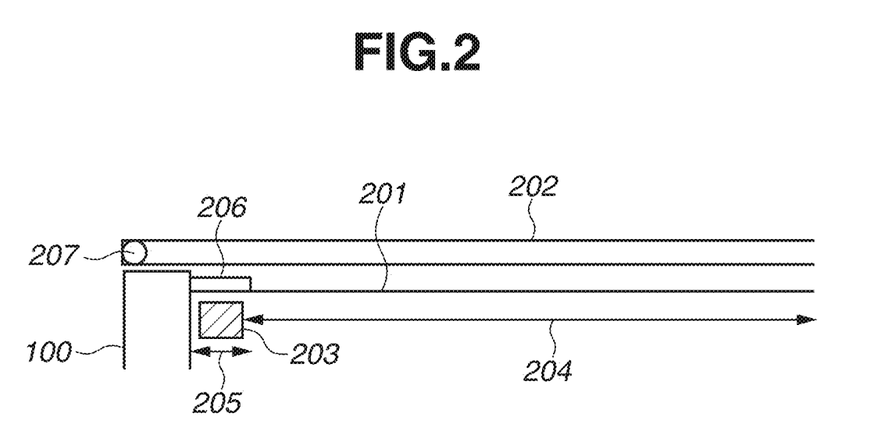
FIG. 2 is a schematic cross-sectional view of an image reading control unit.

FIG. 2 is a schematic cross-sectional view of the image reading control unit 6 included in the MFP 100.

A document platen 201 is formed by a contact glass for maintaining a distance between a scanner sensor and a document constant. A document can be placed on the document platen 201.

A scanner cover 202 is a cover which can turn between a closed position for covering the document platen 201 and an open position for opening the document platen 201. The scanner cover 202 turns around a reference axis 207 placed on an edge portion of the scanner cover 202 on a back surface side of the MFP 100. If the scanner cover 202 is lifted up and the document platen 201 is located in the open position, a user can place a document on the document platen 201. If the scanner cover 202 is located in the closed position, the scanner cover 202 functions as a pressing plate for pressing a document placed on the document platen 201. A user can lift up the scanner cover 202 with a hinge provided to the document platen 201 as a fulcrum (can turn the scanner cover 202 upward in a vertical direction with respect to the document platen 201). A white sheet is attached to a surface of the scanner cover 202 which is in contact with a document placed on the document platen 201 so that scan image data can be obtained without damage. A surface in contact with a document placed on the document platen 201 is namely a surface facing the document platen 201 in a state in which the scanner cover 202 is located in the closed position. The image reading control unit 6 reads an object to be read (a document etc.) which is placed between the scanner cover 202 and the document platen 201 in a state in which the scanner cover 202 is located in the closed position and light from the outside is blocked, and generates image data. As a configuration used by the image reading control unit 6 to read the object to be read, the image reading control unit 6 performs reading by an image sensor unit 203 including a contact image sensor (CIS) according to the present exemplary embodiment.

The image reading control unit 6 includes the image sensor unit 203 and a movement device which drives the image sensor unit 203 in substantially horizontal direction (a direction 204) with respect to the document platen 201. The configuration of the image reading control unit 6 is not limited to the above-described one. For example, a known configuration such as a charge coupled device (CCD) image sensor can be applied to the image reading control unit 6. The image sensor unit 203 is located in a standby position 205 except for during a reading operation. According to the present exemplary embodiment, the standby position 205 is a position facing a calibration sheet 206. The calibration sheet 206 is a sheet for obtaining white reference data for performing characteristic correction of the image sensor unit 203.

<Large Size Document Scan and Large Size Document Copy>

As described above, according to the present exemplary embodiment, the maximum size of a document that the MFP 100 can read in a single operation is the A4 size. However, there is a method for enabling the MFP 100 to read a document larger than the A4 size by changing placement of the document larger than the A4 size and reading the document a plurality of times. This method is referred to as large size document scan. Further, a method for printing an image based on a plurality of pieces of image data obtained by the large size document scan on a sheet after the large size document scan is referred to as large size document copy. As will be understood, each of different portions in a document is read in the plurality of times of reading.

Figure 7:
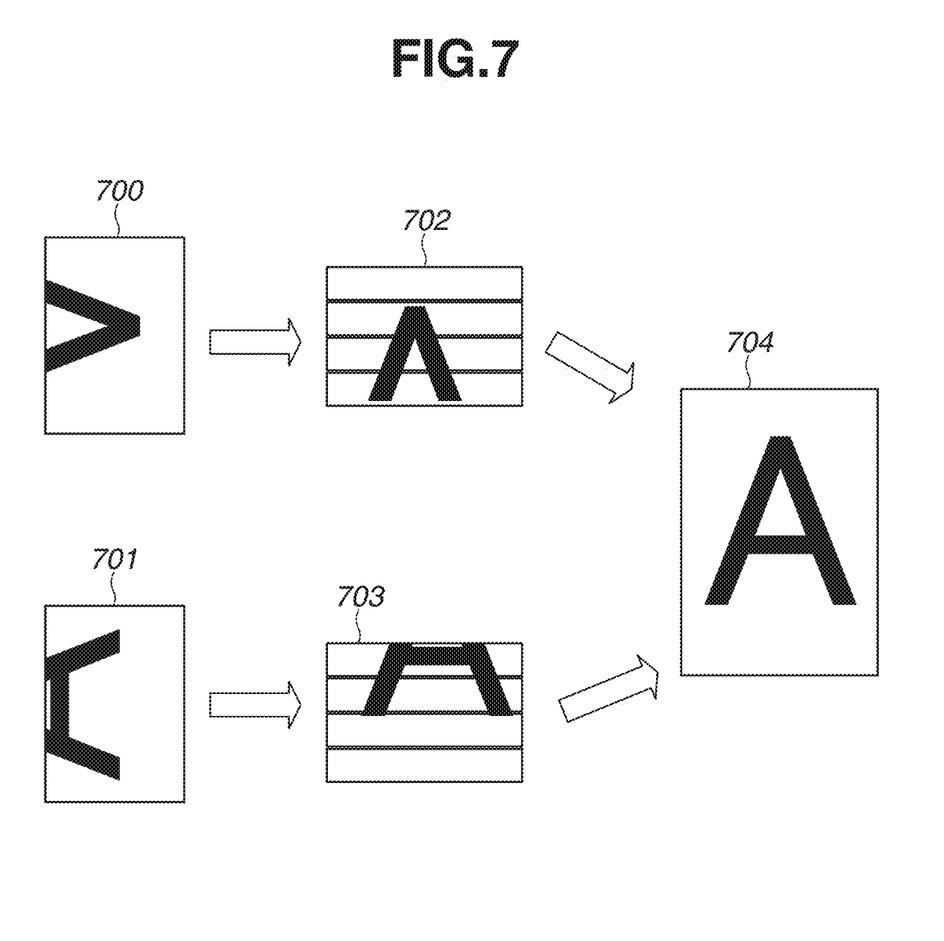
FIG. 7 illustrates image combining processing in large size document copy.

FIG. 7 illustrates combining processing of images in the large size document copy according to the present exemplary embodiment. Image data 700 corresponds an upper half of an A3 size document obtained by first scan. Image data 701 corresponds a lower half of the A3 size document obtained by second scan. The image data 700 and the image data 701 are stored, for example, in a JPEG format in the nonvolatile RAM 12. In other words, two areas included in a same surface of a large size document is read by scan processing of two times in the large size document copy.

In the combining processing, first, the image data 700 is divided into band units. The image data corresponding to each band is expanded by a JPEG expansion unit in the image processing unit 7 and then transmitted to a print engine in the image forming unit 8 so as to be printed in a state in which the image data is rotated counterclockwise by 90 degrees. Accordingly, the images corresponding to the image data 700 rotated counterclockwise by 90 degrees are printed on a sheet. Next, the image data 701 is divided into band units. The image data corresponding to each band is expanded by the JPEG expansion unit in the image processing unit 7 and then transmitted to the print engine in the image forming unit 8 so as to be printed in a state in which the image data is rotated clockwise by 90 degrees. Accordingly, the images corresponding to the image data 701 rotated clockwise by 90 degrees are printed on a sheet following the image corresponding to the image data 700. In other words, an image 704 in which the images corresponding to the image data 700 and the images corresponding to the image data 701 are connected is printed on a sheet.

The combining processing in the large size document copy is not limited to the above-described one. For example, one piece of image data may be generated by combining the image data 700 and the image data 701, and an image based on the generated image data may be printed on a sheet.

Figure 4:
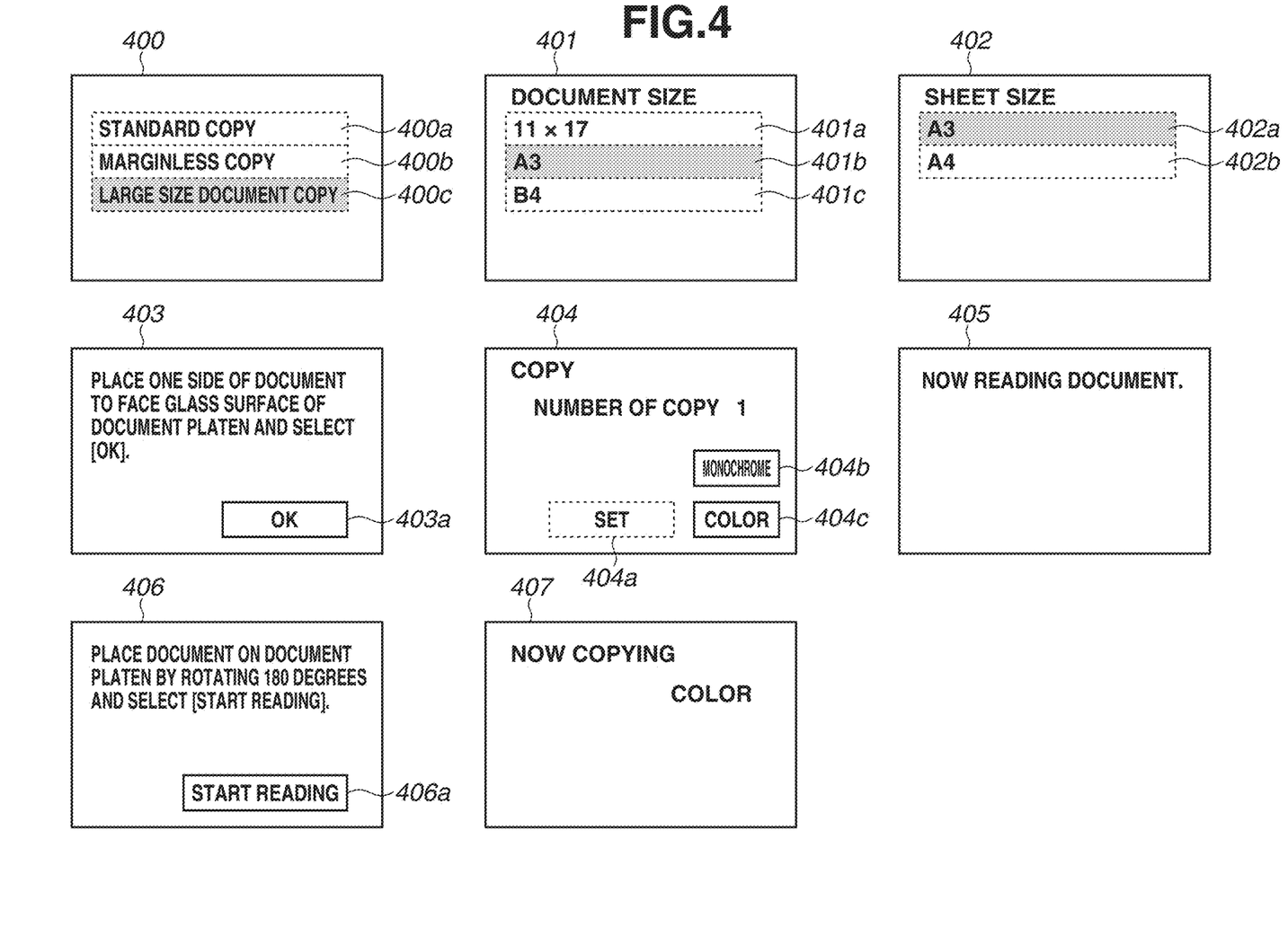
FIG. 4 illustrates examples of screens related to a copy function.

FIG. 4 illustrates examples of screens related to the copy function which are displayed on the operation display unit 103 by the MFP 100 according to the present exemplary embodiment.

A menu selection screen 400 is a screen for receiving an instruction to specify which copy function to use from a user. The menu selection screen 400 is displayed in a case where the user instructs execution of copy processing on a screen not illustrated. A standard copy button 400a is a button for selecting a standard copy function of reading an arbitrary size document placed on the document platen 101 and printing an image on an arbitrary size output sheet by performing magnification the image and the like. In the standard copy, unlike the above-described large size document copy, an image based on image data obtained by scan processing of one time is printed on a recording medium without being combined with another image. A marginless copy button 400b is a button for selecting a marginless copy function of reading an arbitrary size document placed on the document platen 101 and printing an image on an arbitrary size output sheet without margin. In marginless copy, also unlike the above-described large size document copy, an image based on image data obtained by scan processing of one time is printed on a recording medium without being combined with another image. A large size document copy button 400c is a button for selecting a large size document copy function of reading an upper half and a lower half of a document in two times and performing printing by combining two images. The large size document copy is described above in detail. In a case where the large size document copy button 400c is selected, the screen displayed on the operation display unit 103 is switched to a document specification screen 401.

The document specification screen 401 is a screen for receiving an instruction from a user to specify a size of a document to be read in the large size document copy. Buttons 401a, 401b, and 401c are buttons for specifying respectively a 11*17 size, an A3 size, and a B4 size. When any of the buttons is selected, the screen displayed on the operation display unit 103 is switched to a sheet specification screen 402.

The sheet specification screen 402 is a screen for receiving an instruction from a user to specify a size of a sheet to be used in printing. Buttons 402a and 402b are buttons for specifying respectively an A3 size and an A4 size. When either of the buttons is selected, the screen displayed on the operation display unit 103 is switched to a notification screen 403.

The notification screen 403 is a screen for prompting a user to place an upper half of a document on the document platen. The notification screen 403 may include a figure showing how to place a document so as to correctly instruct how to place a document. If an OK button 403a is pressed, the screen displayed on the operation display unit 103 is switched to an instruction reception screen 404.

The instruction reception screen 404 is a screen for receiving an instruction from a user to start copy. If a setting button 404a is pressed, the screen displayed on the operation display unit 103 returns to the document specification screen 401. In other words, the user can redo the setting of the large size document copy by pressing the setting button 404. If a monochrome button 404b is pressed, monochromatic copy processing is started. If a color button 404c is pressed, color copy processing is started. In the monochromatic copy processing and the color copy processing, first, processing for reading an upper half of a document is started. If the monochrome button 404b or the color button 404c is pressed, the screen displayed on the operation display unit 103 is switched to a reading in progress screen 405.

The reading in progress screen 405 is a screen for notifying the user of a fact that reading of the document is in progress. When reading of the document is completed, the screen displayed on the operation display unit 103 is switched to a notification screen 406.

The notification screen 406 is a screen for prompting the user to place a lower half of the document on the document platen. Specifically, the screen prompts the user to turn the document of which the upper half is read 180 degrees and to place the document on the document platen (resets the document). The notification screen 406 may include a figure showing how to place a document so as to correctly instruct how to place a document. The notification screen 406 is displayed in a case where reading of the document is completed and thus assumes a role to notify the user of the completion of reading the document. As described above, according to the present exemplary embodiment, the user is notified when reading of the upper half of the document is completed and prompted to reset the document. If a reading start button 406*a* is pressed, reading of the lower half of the document is started. After reading of the lower half of the document is started, image combining processing is performed, and the image is printed. If printing of the image is started, the screen displayed on the operation display unit 103 is switched to a print in progress screen 407.

The print in progress screen 407 is a screen for notifying the user of a fact that printing is in progress. When printing is completed, the screen displayed on the operation display unit 103 returns to the document specification screen 401.

Figure 5:
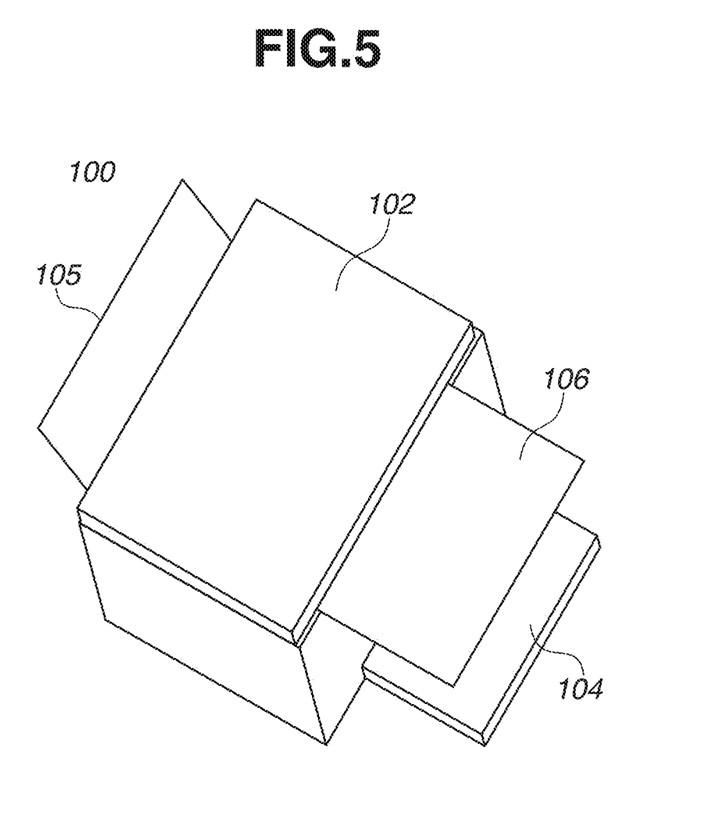
FIG. 5 is an external view of the reading control apparatus in a state in which a large size document is set on a document platen for large size document copy.

An issue to be addressed by the present exemplary embodiment will be described. FIG. 5 is an external view of the MFP 100 in a state in which a large size document (in this case, an A3 size document 106) is set on the document platen 101 for the large size document copy. In FIG. 5, an upper half of the A3 size document 106 is placed on the document platen so as to be read. In this state, a lower half of the A3 size document 106 spreads beyond the document platen 101 and is in a state in which the A3 size document 106 covers the operation display unit 103. Accordingly, the MFP 100 needs to prompt the user to reset the document by notifying the user of completion of reading of the document via the operation display unit 103 during the large size document copy, but it is difficult for the user who is performing the large size document copy to visually recognize the screen displayed on the operation display unit 103.

Therefore, according to the present exemplary embodiment, a configuration is described which can execute notification for a user based on completion of first time reading of a document in an easily recognizable manner for the user in large size document copy.

Figure 6:
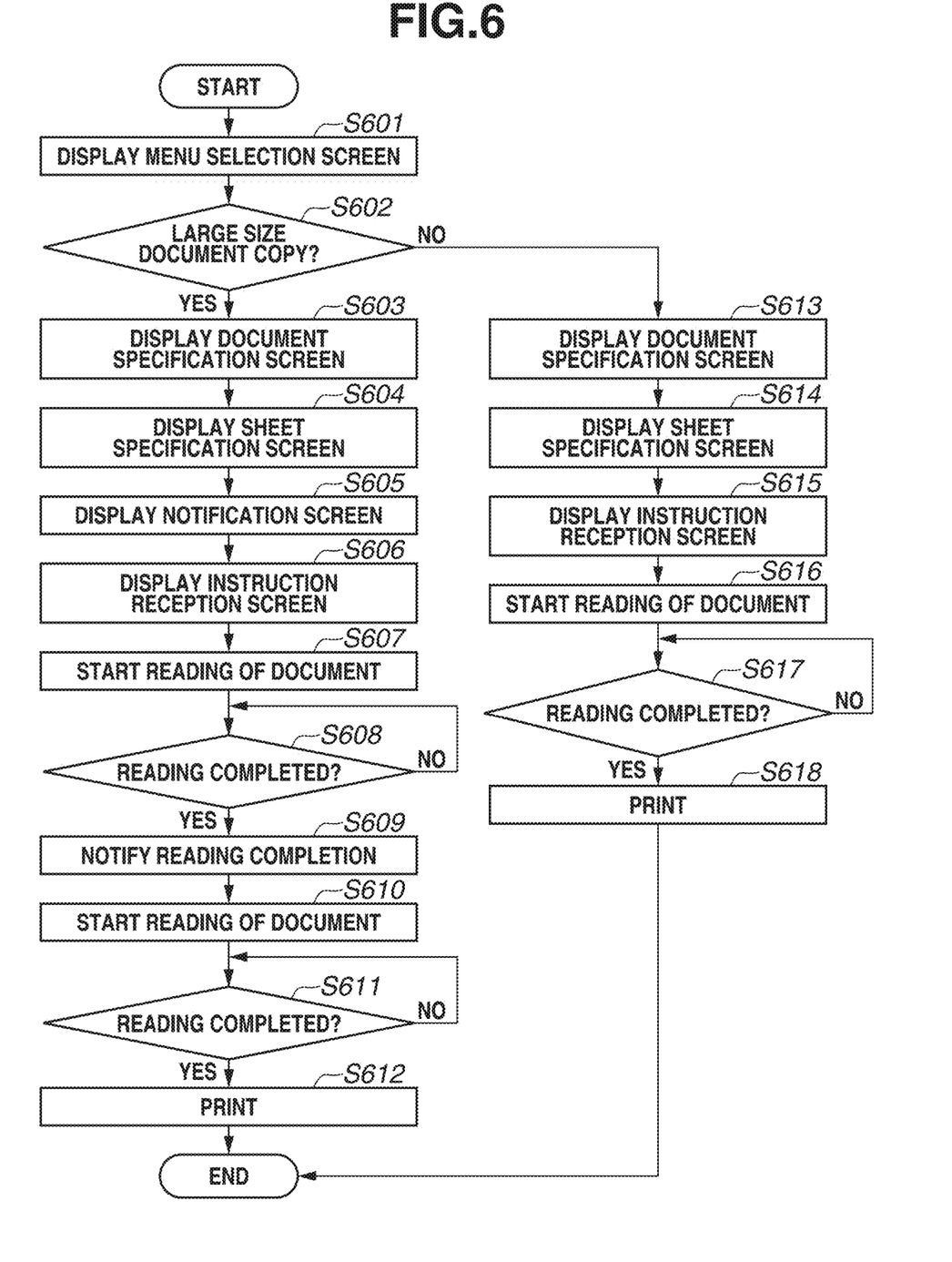
FIG. 6 is a flowchart illustrating processing executed by the reading control apparatus.

FIG. 6 is a flowchart illustrating processing executed by the MFP 100 according to the present exemplary embodiment. The processing illustrated in the present flowchart is realized, for example, by the CPU 9 reading a program stored in a memory such as the ROM 10 to the RAM 11 and executing the read program.

First, in step S601, the CPU 9 displays the menu selection screen 400 on the operation display unit 103 in response to an instruction from a user to execute copy processing. Then, the CPU 9 receives an operation on the menu selection screen 400 from the user.

Next, in step S602, the CPU 9 determines whether the operation performed on the menu selection screen 400 is an execution instruction for the large size document copy. Specifically, the CPU 9 determines whether the operation performed on the menu selection screen 400 is pressing of the large size document copy button 400*c*. In a case where the operation performed on the menu selection screen 400 is the pressing of the large size document copy button 400*c* (YES in step S602), the CPU 9 advances the processing to step S603. On the other hand, in a case where the operation performed on the menu selection screen 400 is not the pressing of the large size document copy button 400*c* (the pressing of the standard copy button 400*a* or the marginless copy button 400*b*) (NO in step S602), the CPU 9 advances the processing to step S613.

The processing after the large size document copy button 400*c* is pressed will be described below. In step S603, the CPU 9 displays the document specification screen 401 on the operation display unit 103. Then, the CPU 9 receives an operation to the document specification screen 401 from the user.

Next, in step S604, the CPU 9 displays the sheet specification screen 402 on the operation display unit 103. Then, the CPU 9 receives an operation to the sheet specification screen 402 from the user.

Next, in step S605, the CPU 9 displays the notification screen 403 on the operation display unit 103. Accordingly, the user places an upper half of a document on the document platen 101. Then, the CPU 9 receives an operation to the notification screen 403 from the user.

Next, in step S606, the CPU 9 displays the instruction reception screen 404 on the operation display unit 103. Then, the CPU 9 receives pressing of the monochrome button 404*b* or the color button 404*c* from the user.

Next, in step S607, the CPU 9 starts reading of the document placed on the document platen 101. A reading width in the reading executed at that time is controlled according to a type of the document specified on the document specification screen 401. Then, the CPU 9 displays the reading in progress screen 405 on the operation display unit 103.

Next, in step S608, the CPU 9 determines whether the reading of the document is completed. In a case where the reading of the document is not completed (NO in step S608), the CPU 9 executes the processing in step S608 again, and, in a case where the reading of the document is completed (YES in step S608), the CPU 9 advances the processing to step S609.

In step S609, the CPU 9 executes reading completion notification processing. The reading completion notification processing is processing for notifying the user of completion of the reading in step S607. Further, the reading completion notification processing is processing for notifying the user of resetting of the document on the document platen for reading in step S610. According to the present exemplary embodiment, the CPU 9 not only displays the notification screen 406 on the operation display unit 103 but also outputs a buzzer sound via the loudspeaker 14 as the reading completion notification processing. Accordingly, if the operation display unit 103 is in a state difficult to be visually recognized by the user as illustrated in FIG. 5 at the time of completion of the reading, the CPU 9 can notify the user of the completion of the reading and instruct the user to reset the document. In this regard, a voice for notifying the user of completion of the reading in step S607 and for notifying the user of resetting of the document on the document platen for reading in step S610 may be generated instead of a buzzer sound. The notification by the sound enables the user to recognize completion of the reading in step S607 without viewing the operation display unit 103 and place the lower half of the document on the document platen 101. Then, the CPU 9 receives an operation on the notification screen 406.

In step S610, the CPU 9 starts reading of the document placed on the document platen 101. Similarly to the reading in step S607, a reading width and a reading height in the reading executed at that time are controlled according to the type of the document specified on the document specification screen 401. Then, the CPU 9 displays the reading in progress screen 405 on the operation display unit 103. According to the present exemplary embodiment, if the type of the document specified on the document specification screen 401 is the A3 size, the entire surface of the document can be read by reading A4 size areas in the document two times, so that a reading width and a reading height in the reading correspond to a width and a height of the A4 size. Further, if the type of the document specified on the document specification screen 401 is the B4 size, the entire surface of the document can be read by reading B5 size areas in the document two times, so that a reading width and a reading height in the reading correspond to a width and a height of the B5 size. Furthermore, if the type of the document specified on the document specification screen 401 is the 11*17 size, the entire surface of the document can be read by reading Letter size areas in the document two times, so that a reading width and a reading height in the reading correspond to a width and a height of the Letter size.

Next, in step S611, the CPU 9 determines whether the reading of the document is completed. In a case where the reading of the document is not completed (NO in step S611), the CPU 9 executes the processing in step S611 again, and in a case where the reading of the document is completed (YES in step S611), the CPU 9 advances the processing to step S612. In a case where the last (the second) reading of the large size document copy is completed, the reading completion notification processing is not executed. In other words, the loudspeaker 14 executes the notification by the sound only at the time of completion of the first reading in the large size document copy and does not execute the notification by the sound at the time of completion of the second reading in the large size document copy. This is because, there is no operation for the user to execute when the last reading is completed. Therefore, it can prevent the notification by the sound from being performed more than necessary and the user from feeling annoyed with the notification by the sound. In a case where the user wishes to prioritize making a notification of the completion of the reading over annoyance caused by the notification by the sound, the notification by the sound may be performed after completion of the last reading without being limited to the above-described configuration.

In step S612, the CPU 9 starts printing. At that time, the image based on the image data obtained in step S605 and the image based on the image data obtained in step S610 are printed on a sheet specified in step S604 as illustrated in FIG. 7. In this regard, if the monochrome button 404*b* is pressed on the instruction reception screen 404, monochrome printing is performed, and if the color button 404*c* is pressed on the instruction reception screen 404, color printing is performed. When the printing is started, the CPU 9 displays the print in progress screen 407 on the operation display unit 103. After completion of the printing, the CPU 9 terminates the processing and displays the menu selection screen 400 again.

Processing after the standard copy button 400*a* or the marginless copy button 400*b* is pressed (NO in step S602) will be described below. In step S613, the CPU 9 displays the document specification screen 401 on the operation display unit 103. The standard copy and the marginless copy are normal copy processing which prints only image data obtained by a single reading operation on a sheet unlike the large size document copy. In other words, in the standard copy and the marginless copy, a document entire area of which on one side thereof (entire surface) can be read by a single reading operation is to be placed on the document platen 101. Therefore, the document size which can be specified on the document specification screen 401 displayed in this step is the maximum size which can be read by the MFP 100 in a single reading operation or smaller.

Then, the CPU 9 receives an operation to the document specification screen 401 from the user.

Next, in step S614, the CPU 9 displays the sheet specification screen 402 on the operation display unit 103. Then, the CPU 9 receives an operation to the sheet specification screen 402 from the user. The sheet specification screen displayed in the standard copy and the marginless copy may be different from the sheet specification screen displayed in the large size document copy. For example, options of sheet types on the sheet specification screen displayed in the standard copy and the marginless copy may be more than options of sheet types on the sheet specification screen displayed in the large size document copy. Further, in the standard copy or the marginless copy according to the present exemplary embodiment, the notification screen 403 is not displayed after the operation to the sheet specification screen 402 is received unlike the large size document copy. This is because the user is highly likely to already know the placement method of the document in the normal copy unlike the large size document copy.

Next, in step S615, the CPU 9 displays the instruction reception screen 404 on the operation display unit 103. Then, the CPU 9 receives pressing of the monochrome button 404*b* or the color button 404*c* from the user.

Next, in step S616, the CPU 9 starts reading of the document placed on the document platen 101. A reading width in the reading executed at that time is controlled according to a type of the document specified by the document specification screen 401. Then, the CPU 9 displays the reading in progress screen 405 on the operation display unit 103.

Next, in step S617, the CPU 9 determines whether the reading of the document is completed. In a case where the reading of the document is not completed (NO in step S617), the CPU 9 executes the processing in step S617 again, and, in a case where the reading of the document is completed (YES in step S617), the CPU 9 advances the processing to step S618. In a case where reading in the standard copy and the marginless copy is completed, the reading completion notification processing is not executed. In other words, the loudspeaker 14 executes the notification by the sound only at the time of completion of the first reading of the large size document copy and does not execute the notification by the sound at the time of completion of the standard copy and the marginless copy.

In step S618, the CPU 9 starts printing. At that time, the image based on the image data obtained in step S616 is printed on a sheet specified in step S614. In this regard, if the standard copy button 400*a* is pressed on the menu selection screen 400, the image is printed on the sheet with margins. On the other hand, if the marginless copy button 400*b* is pressed on the menu selection screen 400, the image is printed on the sheet without margins. Further, if the monochrome button 404*b* is pressed on the instruction reception screen 404, monochrome printing is performed, and if the color button 404*c* is pressed on the instruction reception screen 404, color printing is performed. When the printing is started, the CPU 9 displays the print in progress screen 407 on the operation display unit 103. After completion of the printing, the CPU 9 terminates the processing and displays the menu selection screen 400 again.

According to the above-described configuration, the MFP 100 can issue notification to a user in a case where processing such as the large size document copy in which the operation display unit 103 is covered with a document is executed. Therefore, the MFP 100 can improve user convenience in the large size document copy.

According to the above-described exemplary embodiment, the configuration is described which performs notification by a sound to a user regardless of a size of a document placed on the document platen 101 at a time of completion of first reading in large size document copy. According to a second exemplary embodiment, a configuration is described which controls whether to perform notification by a sound to a user based on a size of a document placed on the document platen 101 at a time of completion of first reading in large size document copy. Descriptions of configurations and processing similar to those according to the first exemplary embodiment are omitted.

Figure 8:
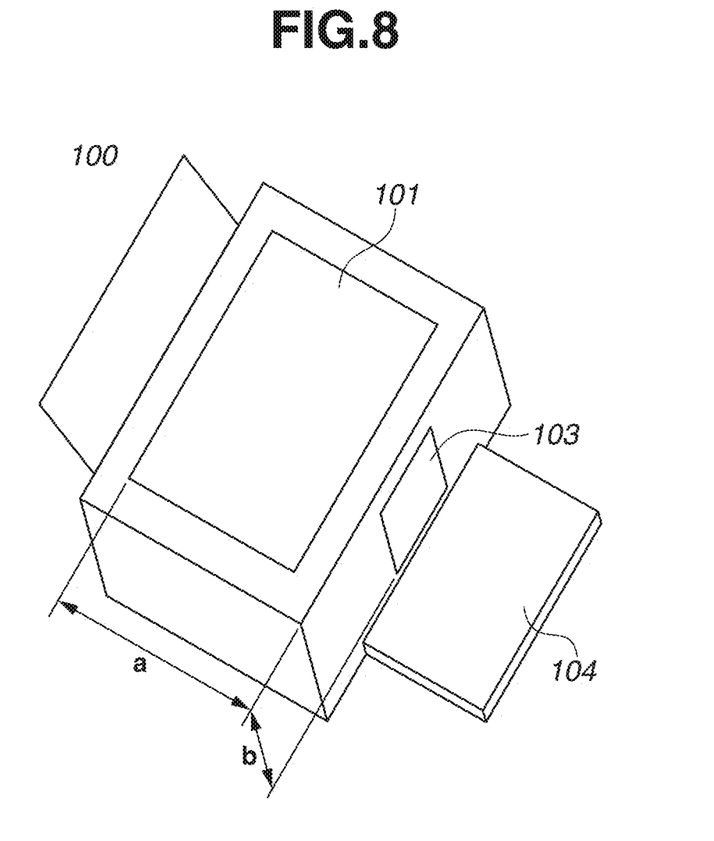
FIG. 8 illustrates dimensions of the reading control apparatus.

FIG. 8 illustrates dimensions of the MFP 100. A distance "a" indicates a sum of a width of the document platen 101 and a distance from a right edge of the document platen 101 to a corner of a housing of the MFP 100. A distance "b" indicates a distance from the corner of the housing of the MFP 100 to a bottom of the operation display unit 103. In a case where a length of a document placed on the document platen 101 exceeds a distance "a+b", the operation display unit 103 is apt to be covered with the document, and it becomes especially difficult for a user to visually recognize the operation display unit 103. Therefore, according to the present exemplary embodiment, a configuration is described which performs notification by a sound in a case where a length of a document placed on the document platen 101 exceeds the distance "a+b" and does not perform the notification by the sound in a case where a length of a document placed on the document platen 101 does not exceed the distance "a+b".

Figure 9:
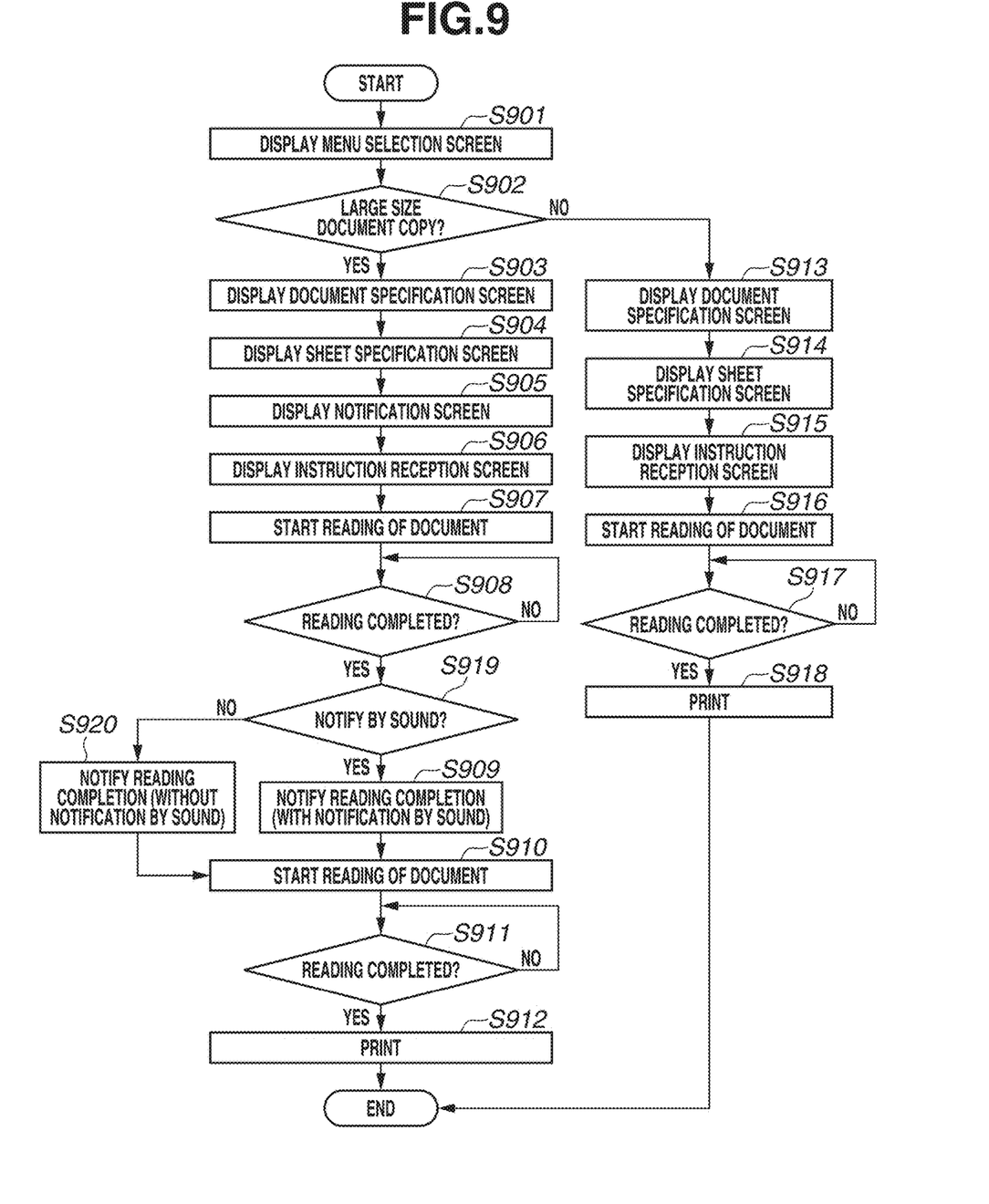
FIG. 9 is a flowchart illustrating processing executed by the reading control apparatus.

FIG. 9 is a flowchart illustrating processing executed by the MFP 100 according to the present exemplary embodiment. The processing illustrated in the present flowchart is realized, for example, by the CPU 9 reading a program stored in a memory such as the ROM 10 to the RAM 11 and executing the read program.

Processing in steps S901 to S918 is similar to the processing in steps S601 to S618, so that the description thereof is omitted.

In step S919, the CPU 9 determines whether to perform the notification by the sound. Specifically, for example, the CPU 9 determines whether a length of a document specified by an input from a user to the document specification screen 401 exceeds the distance "a+b". In a case where the length of the document specified on the document specification screen 401 exceeds the distance "a+b", the CPU 9 determines to perform the notification by the sound. Whereas, in a case where the length of the document specified on the document specification screen 401 does not exceed the distance "a+b", the CPU 9 determines not to perform the notification by the sound. The determination method is not limited to the above-described one. Information about a length of which document exceeds the distance "a+b" among documents which can be specified on the document specification screen 401 is stored in advance in the nonvolatile RAM 12 and the like. The CPU 9 may determine whether the document specified on the document specification screen 401 is the document indicated by the information stored in advance. In a case where the operation display unit 103 is installed on a rotatable member, a length of a document that may hinder a user from visually recognizing the operation display unit 103 in a case where the document is placed on the document platen 101 may differ depending on a rotation state of the member. Therefore, a length used for determining whether to perform the notification by the sound may be an arbitrary length without being limited to the distance "a+b". In a case where the notification by the sound is to be performed (YES in step S919), the CPU 9 advances the processing to step S909, whereas in a case where the notification by the sound is not to be performed (NO in step S919), the CPU 9 advances the processing to step S920.

In step S920, the CPU 9 executes the reading completion notification processing. The notification processing in step S920 is different from the notification processing in step S909, and the CPU 9 displays the notification screen 406 on the operation display unit 103 but does not generate a buzzer sound by the loudspeaker 14.

As described above, according to the present exemplary embodiment, a buzzer sound is not generated even at the time of completion of the first reading in the large size document copy if it is likely that the operation display unit 103 is not in a state difficult to be visually recognized by a user. As a result, the MFP 100 can prevent the user from feeling annoyed by generation of a buzzer sound.

According to the above-described exemplary embodiments, notification by a sound is performed in the configuration which executes printing (a large size document copy function) as output processing for outputting a large size image including a plurality of images corresponding to pieces of image data obtained by a plurality of times of reading. However, the above-described exemplary embodiments are not limited to this configuration. A configuration which executes processing for displaying a large size image on the operation display unit 103 as output processing and a configuration which executes processing for storing image data for expressing a large size image in a predetermined memory as output processing may perform notification by a sound. Further, for example, a configuration which executes processing for transmitting image data that represents a large size image to another apparatus by e-mail and the like as output processing and a configuration which executes processing for displaying a large size image on a display unit included in another apparatus as output processing may perform notification by a sound.

Further, according to the above-described exemplary embodiments, notification is made by a sound. However, the above-described exemplary embodiments may use notification in any methods except notification using the operation display unit 103 without being limited to the configuration. For example, the MFP 100 may perform notification to a user by light by lighting up a light-emitting unit such as a light-emitting diode (LED) arranged on a position which is not covered with a document at the time of the large size document copy. In addition, notification may be executed by both of a sound and light.

The MFP 100 may be able to receive a setting whether to perform notification by a sound from a user. The MFP 100 may perform the notification by the sound in the large size document copy in a case where the notification by the sound is set to be performed and may not perform the notification by the sound in the large size document copy in a case where the notification by the sound is set not to be performed.

Further, according to the above-described exemplary embodiments, one side of a document is read a plurality of times by changing placement of the document in the large size document copy. However, the above-described exemplary embodiments are not limited to this configuration. In other words, a configuration may be such that both surfaces of a document are read and an image corresponding to the both surfaces of the document is printed on a sheet.

Further, according to the above-described exemplary embodiments, reading is performed two times in the large size document copy. However, the above-described exemplary embodiments are not limited to this configuration. Reading may be performed three times or more, and an image corresponding to pieces of image data obtained by the reading performed three times or more may be printed on a sheet. In a case where reading is performed three times or more, the notification by the sound may be executed at the time of completion of the reading each time except the last reading, and the notification by the sound may not be executed at the time of completion of the last reading.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-145043, filed Aug. 1, 2018, which is hereby incorporated by reference herein in its entirety.

What is claimed is:

1. A reading control apparatus which includes a document platen, a reading unit that performs reading processing for reading a document placed on the document platen, and a display unit, the display unit being at least partially covered by a document having at least a predetermined size in a case where the document having at least the predetermined size is placed on the document platen, the reading control apparatus comprising at least one processor,
the at least one processor executes:
displaying, on the display unit, a screen for receiving an execution instruction for first reading processing for reading a first area of the document;
executing the first reading processing based on reception of the execution instruction for the first reading processing;
receiving an execution instruction for second reading processing for reading a second area of the document, the second area including an area of the document different from the first area, and the first area and the second area being included in a same surface of the document;
executing the second reading processing based on reception of the execution instruction for the second reading processing;
in a case that the reading processing is completed, controlling whether or not to perform predetermined notification using a sound generated by a loudspeaker based on whether the reading processing that has completed is the first reading processing or the second reading processing, wherein the controlling is performed such that the predetermined notification is performed based on a fact that the reading processing that has completed is the first reading processing and such that the predetermined notification is not performed based on a fact that the reading processing that has completed is the second reading processing; and
executing output processing for outputting an image including an image based on image data obtained by the first reading processing and an image based on image data obtained by the second reading processing, based on completion of the second reading processing.

2. The reading control apparatus according to claim 1, the at least one processor further executes:
receiving an execution instruction for third reading processing for reading an entire surface of the document;
executing the third reading processing based on reception of the execution instruction for the third reading processing; and
executing image output processing for outputting an image based on image data obtained by the third reading processing based on completion of the third reading processing.

3. The reading control apparatus according to claim 2,
wherein, in a case that the reading processing is completed, whether or not to perform the predetermined notification is controlled based on whether the reading processing that has completed is the first reading processing, the second reading processing, or the third reading processing, and
wherein the controlling is performed such that the predetermined notification is not performed based on a fact that the reading processing that has completed is the third reading processing.

4. The reading control apparatus according to claim 1, the at least one processor further executes:
receiving an input of information about a size of a document to be read by the first reading processing,
controlling whether or not to perform the predetermined notification based on a size based on the inputted information even if the reading processing that has completed is the first reading processing;
wherein, in a case where the size based on the input information is a first size, the predetermined notification is performed based on completion of the first reading processing, and in a case where the size based on the input information is a second size smaller than the first size, the predetermined notification is not performed even upon completion of the first reading processing.

5. The reading control apparatus according to claim 1, wherein the predetermined notification is notification by a buzzer sound generated by the loudspeaker.

6. The reading control apparatus according to claim 1, wherein the predetermined notification is notification by a voice generated by the loudspeaker.

7. The reading control apparatus according to claim 1, wherein, in a case where the predetermined notification is executed, a light-emitting unit further executes notification by emitting light.

8. The reading control apparatus according to claim 1, wherein the predetermined notification is notification for notifying a user of completion of the first reading processing.

9. The reading control apparatus according to claim 1, wherein the predetermined notification is notification for notifying a user to reset the document on the document platen for the second reading processing.

10. The reading control apparatus according to claim 1, wherein the predetermined notification and a notification by displaying a screen on the display unit are executed based on completion of the first reading processing.

11. The reading control apparatus according to claim 1, wherein the output processing is processing for printing the image including the image based on the image data obtained by the first reading processing and the image based on the image data obtained by the second reading processing.

12. The reading control apparatus according to claim 1, wherein the output processing is processing for displaying the image including the image based on the image data obtained by the first reading processing and the image based on the image data obtained by the second reading processing, on the display unit.

13. The reading control apparatus according to claim 1, wherein the output processing is processing for displaying the image including the image based on the image data obtained by the first reading processing and the image based on the image data obtained by the second reading processing, on a display unit included in another apparatus.

14. The reading control apparatus according to claim 1, wherein the output processing is processing for transmitting image data representing the image including the image based on the image data obtained by the first reading processing and the image based on the image data obtained by the second reading processing, to another apparatus.

15. The reading control apparatus according to claim 1, wherein the output processing is processing for storing image data representing the image including the image based on the image data obtained by the first reading processing and the image based on the image data obtained by the second reading processing, in a predetermined memory.

16. The reading control apparatus according to claim 1, wherein the display unit is located on a side surface of a housing of the reading control apparatus.

17. A method for controlling a reading control apparatus, the reading control apparatus including a document platen, a reading unit that performs reading processing for reading a document placed on the document platen and a display unit, the display unit being at least partially covered by a document having at least a predetermined size in a case where the document having at least the predetermined size is placed on the document platen, the method comprising:

displaying, on the display unit, a screen for receiving an execution instruction for first reading processing for reading a first area of the document;

executing the first reading processing based on reception of the execution instruction for the first reading processing;

receiving an execution instruction for second reading processing for reading a second area of the document, the second area including an area of the document different from the first area, and the first area and the second area being included in a same surface of the document;

executing the second reading processing based on reception of the execution instruction for the second reading processing;

in a case that the reading processing is completed, controlling whether or not to perform predetermined notification using a sound generated by a loudspeaker based on whether the reading processing that has completed is the first reading processing or the second reading processing, wherein the controlling is performed such that the predetermined notification is performed based on a fact that the reading processing that has completed is the first reading processing and such that the predetermined notification is not performed based on a fact that the reading processing that has completed is the second reading processing; and executing output processing for outputting an image including an image based on image data obtained by the first reading processing and an image based on image data obtained by the second reading processing, based on completion of the second reading processing.

18. A reading control apparatus which includes a document platen, a reading unit that performs reading processing for reading a document placed on the document platen and a display unit, the display unit being at least partially covered by a document having at least a predetermined size in a case where the document having at least the predetermined size is placed on the document platen, the reading control apparatus comprising at least one processor, the at least one processor executes:

displaying, on the display unit, a screen for receiving an execution instruction for first reading processing for reading a first area of the document;

executing the first reading processing based on reception of the execution instruction for the first reading processing;

receiving an execution instruction for second reading processing for reading a second area of the document, the second area including an area of the document different from the first area, and the first area and the second area being included in a same surface of the document;

executing the second reading processing based on reception of the execution instruction for the second reading processing;

in a case that the reading processing is completed, controlling whether or not to perform predetermined notification using light emitted from a light emitting unit based on whether the reading processing that has completed is the first reading processing or the second reading processing, wherein the controlling is performed such that the predetermined notification is performed based on a fact that the reading processing that has completed is the first reading processing and such that the predetermined notification is not performed based on a fact that the reading processing that has completed is the second reading processing; and executing output processing for outputting an image including an image based on image data obtained by the first reading processing and an image based on image data obtained by the second reading processing, based on completion of the second reading processing wherein the light-emitting unit is located on a position at which the light-emitting unit is not covered with a document having the predetermined size in a case where the document having the predetermined size is placed on the document platen.

\* \* \* \* \*